Nov. 10, 1970 W. W. HARDIN ET AL 3,539,993

HIGH-SPEED REGISTRATION TECHNIQUE FOR POSITION CODE SCANNING

Filed Feb. 28, 1967 3 Sheets-Sheet 1

INVENTORS: WILLIAM W. HARDIN
REINI J. NORMAN

BY Homer L. Knearl AGENT

HIGH-SPEED REGISTRATION TECHNIQUE FOR POSITION CODE SCANNING

Filed Feb. 28, 1967 3 Sheets-Sheet 2

United States Patent Office 3,539,993

Patented Nov. 10, 1970

3,539,993

HIGH-SPEED REGISTRATION TECHNIQUE FOR POSITION CODE SCANNING

William W. Hardin and Reini J. Norman, Stewartville, Minn., assignors to International Business Machines Corporation, Armonk, N.Y., a corporation of New York Filed Feb. 28, 1967, Ser. No. 619,226
Int. Cl. G06k 9/04
U.S. Cl. 340—146.3 19 Claims

ABSTRACT OF THE DISCLOSURE

A cathode ray tube scanning system scans characters on a document so that they may be recognized. The scan pattern is a series of horizontal and vertical bars. A horizontal and a vertical voltage divider are provided for calculating reference positions used in the scan pattern. Track hold circuits set up the initial biasing of the voltage dividers. Based upon reference positions from this initial bias, the scan pattern begins. Resettable amplifiers monitor the deflection signals. Voltage discriminators detect where the scanning beam is in the scan pattern. To coordinate the amplifier signals with the voltage dividers, a reset circuit is provided which resets both the amplifiers and the voltage dividers to the same reference point on the character being read. As the scanning pattern proceeds the first character is read and the right-hand edge of the next character is detected. After the first character has been read the scan pattern is shifted horizontally by resetting the horizontal amplifier. The reset is based upon the right-hand edge detected for the next character. During the scanning of the next character the vertical reference positions in the scan pattern are reset by detecting the top of the next character and resetting the vertical voltage divider to that reference. If the next character is greatly misregistered with respect to the previous character, this condition is detected and a curve follow search and register routine is initiated.

BACKGROUND OF THE INVENTION

This invention relates to increasing the throughput of an optical character reader. More particularly, the invention relates to rapidly shifting a scan pattern from character to character while maintaining position registration on the characters.

Position code scanning is used with predetermined type fonts whose character shapes are position coded. To rapidly scan position coded characters requires either that the characters be very accurately positioned on the document or that the scanner obtain position registration information about each character before it scans it for recognition. The latter operation is more practical in that print quality is not usually good enough to insure that the former operation may be successfully carried out.

The difficulty with obtaining position registration information about each character before scanning is that it is usually very time consuming. For example, each character could be curve followed by the scanner to obtain position registration and thereafter the position code scanning could recognize the character. To curve follow each character, however, slows down the throughput of the machine. The problem is that any prescan cycle used for position registering on the next character will consume valuable time. Restated, the problem is how to reduce the amount of scanning time used to position register characters for position code scanning.

SUMMARY OF THE INVENTION

It is an object of this invention to minimize position registration scanning in an optical character reader.

It is another object of this invention to eliminate the necessity of making a complete prescan of the next character before making the recognition scan.

It is another object of this invention to obtain position registration information on the next character to be scanned while performing a recognition scan on the character being read.

It is another object of the invention to detect the position registration of the next character to be read relative to the character being read and to thereby make miner readjustments to the position registration of he scanner when the next character is to be read.

It is another object of the invention to rapidly shift a scan pattern from character to character wherein the scan pattern crosses a first character for recognition and the next character for position registration.

In accordance with the invention, the above objects are accomplished by a scan control which directs the scanning beam in a cyclic position code scanning pattern, In each cycle of the scan pattern, the scanner crosses one character for recognition and intersects the next character. From these intersections the position registration information of the next character is detected and passed to a reset circuit. The reset circuit resets the reference positions in the scan pattern at the end of a cycle in the scan pattern. The resetting of the reference positions causes the scan pattern to shift so that it is referenced to the next character to be read at the start of the next cycle.

In another feature of the invention, a search control directs the scanning beam in a search and register routine to determine initially the position of a character to be read. When this routine is complete, the scan control is initiated and the scanning beam is directed in the cyclic scan pattern. Thereafter, the cyclic scan pattern will be reset so that the scan pattern is shifted from character to character. This occurs so long as one character relative to the preceding character is not greatly misregistered. If the next character is greatly misregistered, a detector senses the misregistration and initiates the search control to start the search and register routine again. Therefore, when minor readjustments are needed to scan the next character, the cyclic scan pattern continues; however, when major readjustments are needed, a search and register routine is initiated.

The advantage of the invention is that it eliminates extensive and elaborate prescanning of the next character to obtain position registration. Elaborate position registration scans need only be used to obtain position registration on the first character in a line. Thereafter, successive characters in a line may be rapidly scanned by rapidly shifting the scan pattern from character to character. Furthermore, by making minor registration corrections during the shifting of the scan pattern the scanning beam can follow a skewed line of characters. The foregoing and other objects, features and advantages of the invention will be apparent from the following more particular description of the preferred embodiment of the invention, as illustrated in the accompanying drawings.

GENERAL DESCRIPTION

Figure 1:
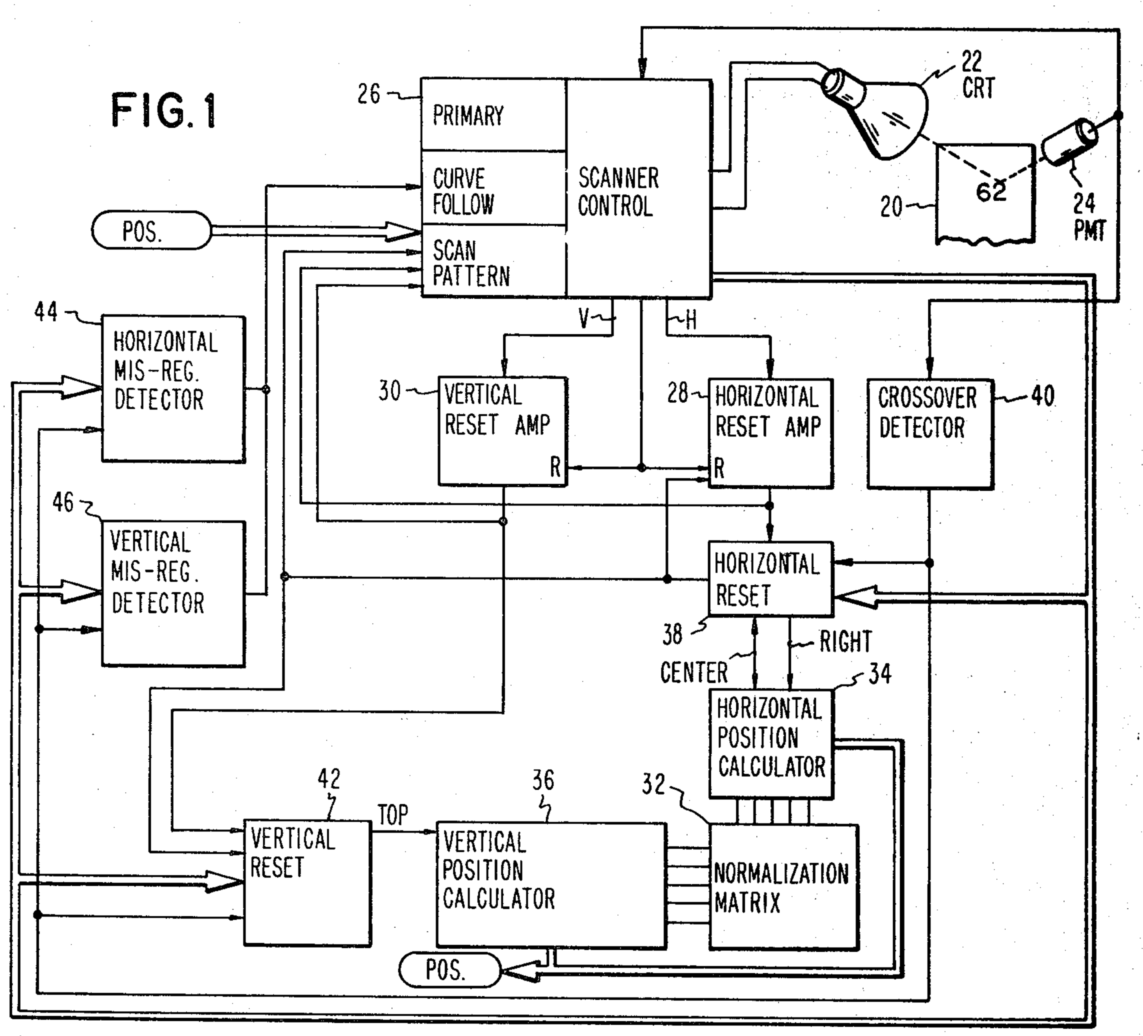
FIG. 1 shows a systems block diagram of a preferred embodiment of the invention.

Now referring to FIG. 1, the scanner shown in the preferred embodiment is a cathode ray tube. Document 20 with characters printed thereon is scanned by a light beam from cathode ray tube (CRT) 22. Light reflected from the document is picked up by photomultiplier tube (PMT) 24. The signal from photomultiplier tube 24 is fed back to the scanner control 26 and is also fed to the crossover detect circuit 40. The crossover detect circuit 40 generates an output signal everytime the scanning beam intersects black (a portion of a character) on the document 20.

Figure 3:
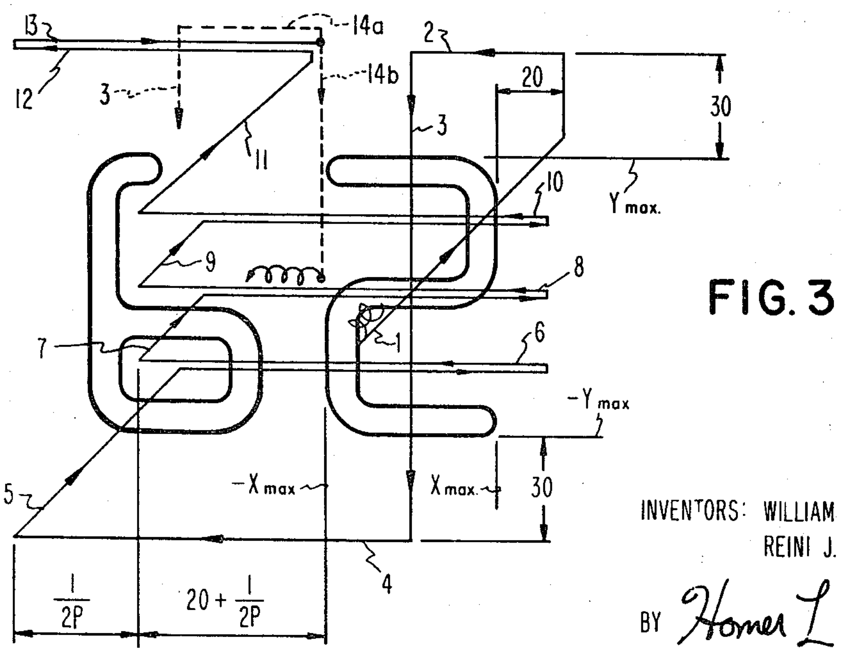
FIG. 3 shows the scan pattern used in the preferred embodiment of the invention.

The scanner control 26 contains three separate control systems—primary, curve follow and scan pattern. The primary control system directs the scanning beam along the right-hand margin of the document 20 until the beam is positioned adjacent to a first character in a line of characters. The curve follow control system is then activated and directs the beam to search and register on the first character in the line of characters. The search and register routine is accomplished by a curve follow scan which searches for the character and then curve follows the periphery of the character. After the beam follows around the outside of the character a single time, the scan pattern control system is activated. As shown in FIG. 3, the scan pattern covers two characters. The scan pattern is scanning, the numerical 2 for recognition and the numeral 6 for position registration.

The characters being scanned are type fonts which are coded in shape. Elements of each character are position coded so that a pattern of crossovers (intersections between the scanning beam and a character) will identify the character. To detect the position of the elements of the character being scanned, normalization matrix 32 is provided. The matrix is made up of detectors conditioned by the horizontal and vertical dimensions of the character being scanned and by the horizontal and vertical deflection signals of the scanner. Such a normalization matrix is described in detail in commonly assigned Pat. 2,248,699 entitled "Normalizing Multilevel Quantizer." When beam position information from the normalization matrix is coordinated with crossover detections, position coded type fonts may be machine read. Recognition apparatus is not shown in this disclosure as the invention here deals with rapidly shifting the scan pattern generated by scanner control 26 from character to character.

Normalization matrix 32 receives the horizontal and vertical coordinates for the matrix from the horizontal position calculator 34 and from the vertical position calculator 36. These calculators divide the horizontal and vertical dimensions of a character into a number of equal voltage differences for biasing the coordinates of the matrix 32. In the matrix the horizontal character center is referenced to ground; positive voltages are dimensions to the right of center; negative voltages are dimensions to the left of center. In the vertical dimension of the matrix, the top of the character voltage is the reference voltage. Voltages below the top-of-character voltage are dimensions below the top of character; voltages above the top-of-character voltage are dimensions above the top of character.

Because the character reader will be working with characters of known height and width, voltage levels in the normalization martix are defined if one horizontal and vertical voltage position of the character is known. For example, a given character height corresponds to a given voltage difference. If the voltage at the top of the character is known, then the voltage at the bottom of the character may be calculated. Likewise if the voltage at the center of the character is known, then the voltages at the right and left edges of the character may be calculated.

To direct the scanning beam through the scan pattern in FIG. 3, scan pattern control in scanner control 26 includes a scanner position detector and a scan control. The scanner position detector detects when the scanning beam is crossing reference positions or boundaries in the scan pattern. The scan control responds to these detected crossings to direct the scanning beam along each step of the scan pattern. To detect crossings, the scanner position detector receives information from resettable amplifiers 28 and 30 and position calculators 34 and 36. Horizontal and vertical scanning beam position is monitored by the resettable amplifiers 28 and 30 and passed to the scanner position detector in the scan pattern control. Reference positions or boundaries are calculated by the horizontal and vertical position calculators 34 and 36 and passed to the scanner position detector. To direct the scan pattern relative to the character being scanned requires the horizontal and vertical beam position signals from the resettable amplifiers 28 and 30 and the reference positions calculated in the horizontal and vertical position calculators 34 and 36 to be coordinated to the same position on the character being read.

As scanning progresses from character to character, the horizontal amplifier 28 is coordinated with the horizontal position calculator 34 at the horizontal center of the character to be read. In the horizontal position calculator 34 the horizontal character center of the character to be read is defined as being at ground voltage. The horizontal position calculator maintains this same reference point as the scan pattern is shifted horizontally from character to character. To accomplish the shifting the horizontal amplifier 28 is reset to a ground reference at the beginning of each new cycle in the scan pattern. This reset to ground reference occurs when the scanning beam is positioned at the horizontal center of the next character. At this position the horizontal amplifier 28 is reset so that it monitors changes in the scanning position relative to the horizontal center of the next character. This causes the scan pattern to shift to the next character and that character becomes the character to be read. The reset of the amplifier 28 is accomplished by resetting it to ground since ground represents the horizontal character center of the character to be read as defined in the horizontal position calculator 34. Therefore the horizontal amplifier 28 will be coordinated with the horizontal position calculator 34 if the amplifier is reset to ground when the scanning beam is at the horizontal center of the next character to be scanned.

As scanning progresses from character to character, the vertical position calculator 36 is reset. The vertical position calculator 36 is reset to the voltage at the top of the next character to be scanned when the scanning beam is positioned at the top of that character. Resetting at that beam position means the top of character voltage out of the vertical amplifier 30 will correspond to the top of the character voltage applied to the vertical position calculator 36. Thus the vertical beam position monitored by vertical amplifier 30 and the reference positions calculated by the vertical position calculator 36 will both be referenced to the top of character voltage.

As scanning progresses from line to line, the scan pattern is initially set by resetting both the horizontal and vertical amplifiers 28 and 30 when the first character in a line is located by the search and register routine. This positions the scan pattern approximately for the first character in a line. As the first character is being scanned by the scan pattern, the amplifiers 28 and 30 are coordinated with the position calculators 34 and 36 in the manner just described above.

To accomplish horizontal reset the horizontal reset circuit 38 operates in two modes. In the first mode when the horizontal reset 38 receives the curve follow indication from scanner control 26, the horizontal reset follows the positive horizontal signals out of the reset amplifier 28. The horizontal reset amplifier 28 is reset to ground during curve follow scanning. After being reset, the amplifier 28 monitors the horizontal deflection signal so that ground voltage corresponds to the horizontal position where the scanning beam begins to curve follow the character. As the scanning beam begins to curve follow the character, the horizontal reset 38 follows the horizontal deflection signal and stores a maximum positive horifiontal voltage during the curve following of the outside periphery of the character. This maximum positive voltage corresponds to the right-hand edge of the character. When the curve following of the character is completed, this maximum positive voltage or right-hand edge voltage is passed to the horizontal position calculator and is the basis of the initial horizontal setting of positions in the position calculator 34.

As previously pointed out, the horizontal position calculator 34 is to be set eventually so that the horizontal character center is at ground. After the initial setting of the calculator to the right-hand edge of the character during the curve follow operation, the horizontal reset 38 switches into mode 2 operation.

In mode 2 operation the horizontal reset compares the voltage defining the horizontal center of the character as supplied by the horizontal calculator 34 with the beam position as supplied by the horizontal reset amplifier 28. When the voltages are identical, the horizontal reset resets the horizontal amplifier 28 to ground, removes the right-hand edge of character voltage previously applied to the position calculator 34 and applies ground voltage to the horizontal center position in the calculator 34. At the end of this mode 2 operation the horizontal center of the position calculator 34 is held at ground and the horizontal reset amplifier 28 will be at ground each time the scanning beam returns to the horizontal center of the character. Thus the horizontal amplifier 28 and the horizontal position calculator 34 are now coordinated since both are referenced to ground at the horizontal center of the character.

A similar mode 2 operation takes place when it is necessary to shift the scan pattern horizontally to scan the next character in the line. In this instance, the horizontal reset 38 detects the position of the next character. To do this it looks for the right-hand edge of the next character by watching for crossovers during the extended portion of the horizontal scans. A crossover occurs when the scanning beam intersects a character; they are detected by crossover detector 40. During the extended horizontal scans through the upper half of the next character and through the lower half of the next character the horizontal reset 38 looks for the first crossover, i.e., the right-hand edge of the next character. This right-hand edge of the next character sets up a voltage which is used to define the voltage at the center of the next character. When the scanning beam is directed to move horizontally to the next character, the horizontal reset 38 compares the scanning beam deflection voltage from the amplifier 28 with the voltage indicative of the next character center. When the voltages agree, the horizontal reset 38 resets the output of the horizontal amplifier 28 to start at ground. The scanning pattern may then be continued with the output from the horizontal amplifier 28 now being referenced to ground at the center of the next character.

The signal from the horizontal reset 38 which resets the horizontal amplifier 28 is also passed to the scanner control 26 and vertical reset 42 to initiate the vertical scan down through the character and a mode 2 operation in vertical reset 42 respectively. During this vertical scan the vertical reset 42 resets the vertical position calculator 36 to the voltage out of the vertical reset amplifier 30 when the scanning beam is positioned at the top of the character. This operation of the vertical reset 42 will be referred to as mode 2 operation as it occurs right after the mode 2 operation in the horizontal reset 38.

Vertical reset 42 has a mode 1 and a mode 2 operation similar to the horizontal reset 38. Mode 1 operation occurs simultaneously with mode 1 operation in the horizontal reset. In mode 1, when the vertical reset 42 receives the curve follow mode indication from scanner control 26, the vertical reset follows the postive vertical signals out of the reset amplifier 30. The vertical reset amplifier 30 is reset to ground during curve follow scanning. After being reset, the amplifier 30 monitors the vertical deflection signal so that ground voltage out of the amplifier corresponds to the vertical position where the scanning beam begins to curve follow the character. As the scanning beam begins to curve follow the character, the vertical reset 42 follows the vertical deflection signal and stores a maximum positive vertical voltage during the curve following of the outside periphery of the character. This maximum positive voltage corresponds to the top of the character. When the curve following of the character is completed, this maximum positive voltage or top of character voltage is passed to the vertical position calculator 36 and is the basis of the initial vertical setting of positions in the vertical position calculator 36.

The vertical reset 42 is triggered into mode 2 operation when it receives a signal from the horizontal reset 38 indicating that the scanner is starting the vertical scan through the horizontal center of the character. In mode 2 operation the vertical reset detects the vertical position of the next character and resets the vertical position calculator 36 accordingly. From the scanner control 26 the vertical reset 42 receives signals which tell it whether the scanning beam is in a high, middle or low zone of the character. These zones are defined by the position of the previous character and are sufficiently accurate for the purposes of vertical reset if the vertical misregistration between characters is not too great. Large vertical misregistrations will be detected as described shortly.

The vertical reset 42 also receives a signal from the crossover detect circuits 40 indicating when the scanning beam intersects the character. Since this first crossover could occur in the high, middle or low zone of the character, the vertical reset must know in which zone the first crossover occurred. The zone information is used by the vertical reset in conjunction with the first crossover detected by the crossover detect circuits 40 to detect in which zone the first crossover occurs.

While the vertical reset 42 is monitoring the vertical crossovers and zones, it is also following the vertical position voltage out of the vertical amplifier 30. When the first crossover is detected, the vertical reset 42 stores the voltage received at that time from the vertical reset amplifier 30. If the first crossover occurred in the high zone, the voltage stored in the vertical reset is passed directly to the vertical position calculator 36 to normalize the matrix 32 to the top of the character. If the first crossover is detected in the middle zone, a constant voltage is added to the voltage stored in the vertical reset 42. The summed voltage then corresponds to the voltage at the top of the character. The summed voltage is passed to the vertical calculator 36 to normalize the matrix 32 to the top of the character. Similarly, if the first crossover occurs in the low zone, a larger constant voltage is added to the stored voltage so as to normalize the matrix 32 to the top of the character.

The mode 2 operation in the horizontal reset 38 and the vertical 32 are used to make minor readjustments in the position calculator 36 and the horizontal amplifier 28 as the scan pattern shifts from character to character. However, if a character relative to its preceding character is grossly misregistered (as for example more than a half of a character height above or below the center of the previous character or more than a character width to the left of the previous character) the horizontal reset 38 and the vertical reset 42 are switched into mode 1 operation as the curve follow control initiates the search and register to find the next character. To detect these gross misregistrations and signal the scanner control to initiate the search and register routine, horizontal misregistration detector 44 and vertical misregistration detector 46 are provided.

The horizontal misregistration detector 44 monitors the crossover detect circuits 40 during the extending horizontal scans. If during these extended scans, the next character is not intersected, the horizontal misregistration detector generates an output signal. This signal indicates that the next character is horizontally misregistered with respect to the present character being scanned and signals the scanner control 26 to switch to the curve following mode of operation.

The vertical misregistration detector 46 monitors the crossover detect circuits 40 during a horizontal scan below character and a horizontal scan above character. These horizontal scans are based upon the position of the previous character and are such that no crossover will be detected unless the next character is vertically misregistered by approximately one-half the height of the character. If the next character is greatly misregistered, a crossover will be detected by circuits 40 during the scans which normally would be above or below the character. The detector 46 then signals the scanner control 26 that a vertical misregistration has occurred and the scanner switches into the search and register routine.

DETAILED DESCRIPTION

Figures 2, 2B:
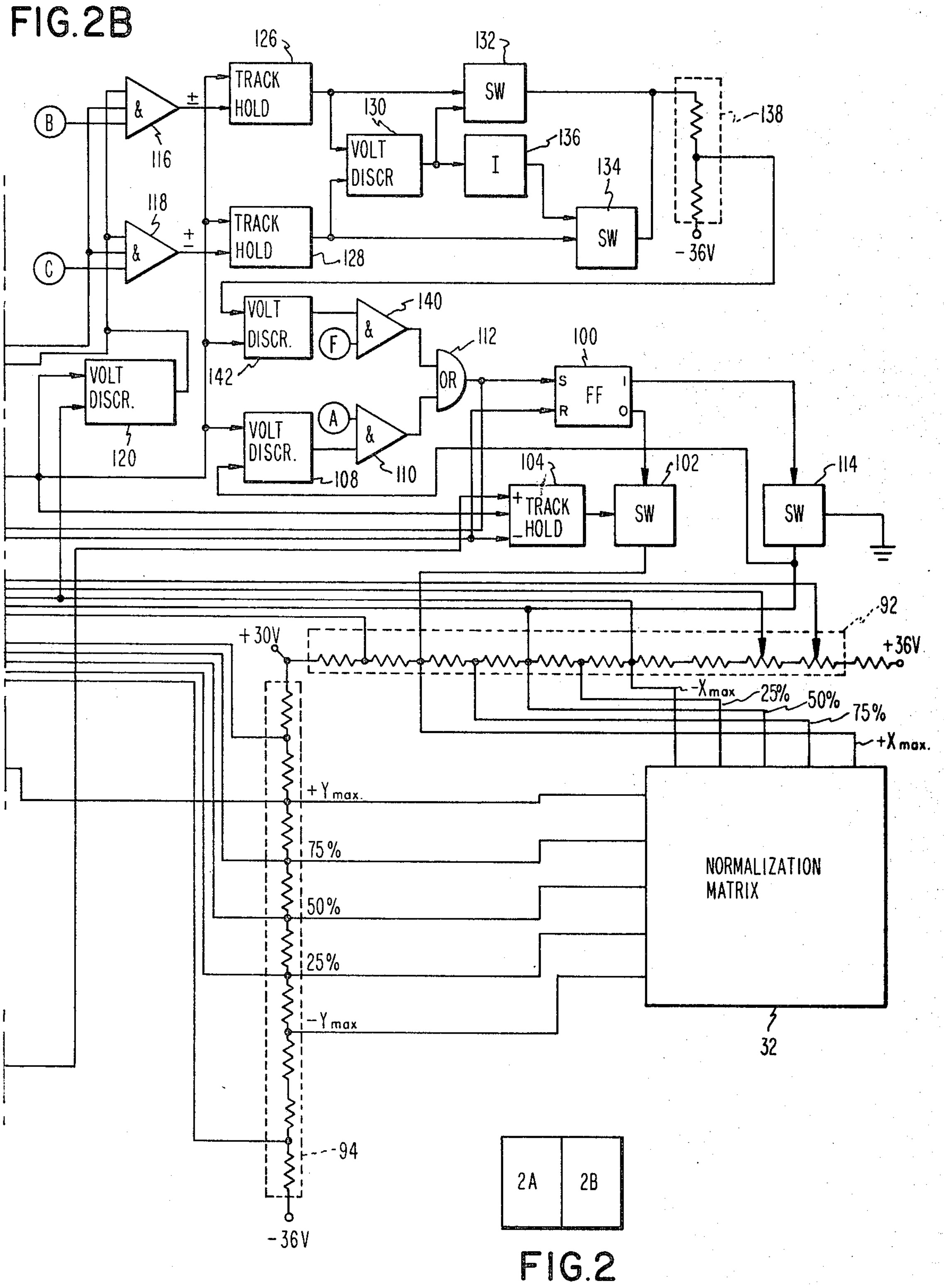
FIG. 2 shows a schematic logic block diagram of the preferred embodiment of the invention.

Referring now to FIG. 2, the system shown in FIG. 1 is shown in detail. The document 20 is again scanned by a beam from cathode ray tube 22. Reflected light from the document 20 is picked up by the photomultiplier tube 24.

Initially, the scanning beam must be positioned at the right-hand margin adjacent to a first character in a line of characters. This is accomplished by the primary beam control 50. The details of the primary beam control have been omitted as they are not material to the invention and could be implemented in any number of ways. As one possible example, a computer might be programmed to perform the primary control functions. In operation, the primary beam control generates horizontal and vertical deflection signals which are integrated by the vertical and horizontal integrators 52 and 54. The integrated signals are then applied to the vertical and horizontal deflection circuits 56 and 58. The primary beam control continues to direct the scanning beam until it detects in the video signal from photomultiplier tube 24 indications that the scanning beam is at the right-hand margin opposite vertically centered on a line of characters. When these conditions are detected, the primary beam control generates an output signal which is passed by OR gate 60 to the curve follow control 62 and to flip-flops 64 and 66. Flips-flops 64 and 66 control the resetting of the horizontal and vertical reset amplifiers 28 and 30 and will be discussed in more detail shortly.

The purpose of curve follow control or search control 62 is to search out a character and register upon it. Registration is the determination of the position of horizontal and vertical extremes of the character. The curve follow control 62 is described fully in commonly assigned copending patent application 534,178, filed Mar. 14, 1966, and entitled, "Complete Scanning Cycle Detector for Character Recognition Systems," now Pat. No. 3,490,002. When searching, the curve follow control directs the cathode ray scanning beam in a horizontal curlicue pattern. In effect the scanning beam acts as if it were following a horizontal line. The vertical location of this imaginary horizontal line is the scanning beam position at the time that the start of search is initiated by the signal from the primary beam control 50 via OR gate 60.

When the scanning beam strikes a character during search or horizontal curlicue scanning, the search mode of operation in the curve follow control 62 terminates and the register mode starts. This mode consists of normal curve follow operation around the periphery of the character. After one complete curve follow cycle around the character, the curve follow control 62 generates an output signal which is passed to the gating logic 72. This signal indicates the curve follow operation is ceasing and initiate the scan pattern operation which is controlled by the gating logic 72.

To perform the scan pattern (shown in FIG. 3), gating logic 72 turns on and off the positive/negative, vertical/horizonal current sources 74, 76, 78 and 80. The outputs from the vertical current sources 74 and 76 are accumulated in the vertical integrator 52, while the outputs from the horizontal current sources 78 and 80 are accumulated in the horizontal integrator 54. The composition of the gating logic is straightforward. It is made up of AND gates, OR gates and flip-flops as required to perform the logical statements which turn the current sources on and off. The current sources are turned on and off to achieve the scan pattern shown in FIG. 3. As anyone skilled in logical operations can implement the gating logic, the details of the logic are not shown. The logical statements performed by the gating logic are shown in the following table. In this table "X" is the horizontal dimension and the letter "Y" is the vertical dimension. The dimensions "20" and "30" are in mils (inches$\times 10^{-3}$); the letter "P" stands for character pitch. The boundaries used in the logical statements of the table are shown in FIG. 3. These boundaries are defined in FIG. 2 by voltage discriminators 82–91 whose outputs are passed to the gating logic 72.

TABLE OF LOGICAL STATEMENTS FOR GATING LOGIC (1) Upon being initialized by curve follow control 62 turn on +X and +Y (current sources 74 and 78). At $+X_{max}$ +20 turn off +X (current source 78). At $+Y_{max}$ +30 turn off +Y (current source 74).

(2) Turn on −X. Upon receiving start-of-vertical-scan signal from horizontal reset turn off −X (current source 80).

(3) Turn on—Y (current source 76). At $-Y_{max}$ −30 turn off −Y (current source 80).

(4) Turn on −X. Turn off −X at $-X_{max}$ −20 −1/P.–

(5) Turn on +X and +Y. Turn off +X at $+X_{max}$ +30. Turn off +Y at $-Y_{max}$ +25%.

(6) Turn on −X. Turn off −X at −max −20 −1/2P.

(7) Repeat step (5) except turn off +Y at $-Y_{max}$ +50%.

(8) Repeat step (6).

(9) Repeat step (5) except turn off +Y at $-Y_{max}$ +75%.

(10) Repeat step (6).

(11) Turn on +X and +Y. Turn off +Y at $+Y_{max}$ +30. Turn off +X at $-X_{max}$.

(12) Turn on −X. Turn off −X at $-X_{max}$ −20 −1/P.

(13) Turn on +X. Turn off +X at $-X_{max}$.

(14) If no misregistration detected, turn on −X. Turn off −X when start-of-vertical-scan signal is received from horizontal reset. Go back to step 3.

(14*b*) If a misregistration is detected, turn on −Y. Turn off −Y at $-Y_{max}$ +50%. Signal curve follow control to initiate search and register routine.

Figure 2A:
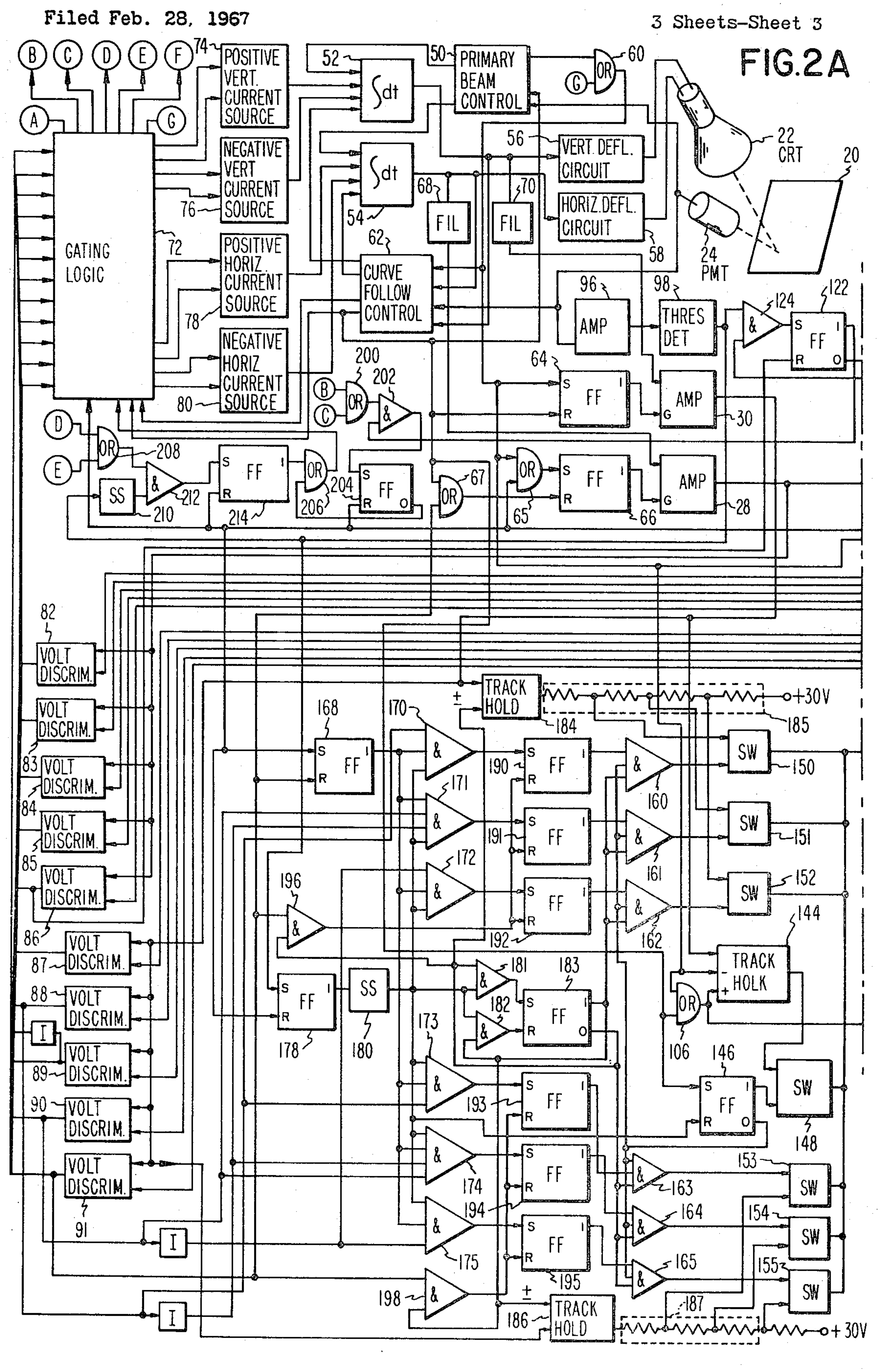

As just pointed out the reference positions or boundaries used in this table are detected by the voltage discriminators 82–91 shown in the bottom left corner of FIG. 2A. These voltage discriminators constitute a scanner position detector which detects when the scanning beam is crossing reference positions in the scan pattern formed by the above logical statements. Voltage discriminators 82–86 receive one input from voltage taps on the horizontal voltage divider 92 (FIG. 2B) and the other input from the horizontal resettable amplifier 28. Similarly, the voltage discriminators 87–91 receive one input from the taps on the vertical voltage divider 94 (FIG. 2B) and the other input from the vertical resettable amplifier 30. The inputs from the voltage dividers define the reference positions or boundaries. The inputs from the horizontal and vertical amplifiers indicate the present scan position. Accordingly, a change in output from a voltage discriminator indicates when the scanning beam is crossing a reference position.

The purpose of the resettable amplifiers is to amplify and monitor the deflection signals so that small variations in the deflection signal may be analyzed for purposes of controlling the scan pattern. These amplifiers 28 and 30 receive their deflection signal inputs from filters 68 and 70, respectively. The purpose of the filters is to eliminate the high frequency variations in the deflection signal which correspond to the curlicue pattern. The filtered signals applied to amplifiers 28 and 30 contain only the slow variations in the deflection signals. Thus, the output from the filter 68 and 70 is the gross deflection signal without the curlicue pattern superimposed thereon.

As previously pointed out, the amplifiers 28 and 30 are resettable to ground so that when reset their outputs act as if the input were at ground. Upon release of this reset or gating condition the amplifiers amplify the input signal relative to the input signal voltage at the time when release occurred. The details of the resettable amplifier are described in copending commonly assigned patent application 516,573, filed Dec. 27, 1965, by J. C. Greeson, Jr. and J. J. Kennedy, and entitled "Compensating Reset Circuit," now Pat. No. 3,451,217. As described in the copending patent application, the compensating reset circuit contains an amplifier with a feedback loop. In the feedback loop there is a comparator to compare the output of the amplifier with a reference level. The amplifiers 28 and 30 use a reference level of ground or zero voltage. The output from the comparator is used as a compensating signal which is fed back to the input of the amplifier. This compensating input is also stored in a capacitive storage circuit. The feedback loop can be gated on or off when the feedback loop is gated on, the comparator provides a compensating signal equal and opposite to the input signal so that the output of the amplifier is locked to ground. When the feedback loop is off, the capacitive storage circuit continues to feed in the compensation last used. Accordingly, the output of the amplifier is the amplified input signal amplified with respect to the compensation. In other words if the output of the amplifier is held at ground so long as the amplifier is being reset, when the reset condition is released, the output follows fluctuations in the input signal as if the input signal were at ground when the release occurred.

To detect crossovers, i.e., when the scanning beam has intercepted a character, amplifier 96 and threshold detector 98 are provided. The video signal from photomultiplier tube 24 is amplified by amplifier 96 and passed to the threshold detector 98. The threshold detector is set so that when the video signal dips below a given level the detector has an output. This output indicates that the scanning beam is now crossing black or in other words that the scanning beam is now on a character. Of course, the document could just as well be white characters on a black background in which case the indications of character or no character information out of the threshold detector 98 would be reversed.

Referring now to the upper half of FIGS. 2A and 2B, the details of the horizontal reset are shown. In mode 1 operation curve follow control 62 is directing the beam in a curlicue pattern to search for a character. The signal from OR gate 60 which initiates the search mode of operation in curve follow control 62 is also used to reset flip-flop 100 (FIG. 2A). The zero output from flip-flop 100 is used to switch on switch 102 so that it passes the voltage signal from the track hold 104. While the scanning beam is searching to the left, the track hold 104 has both its positive and negative gates conditioned so that it follows both positive and negative swings in the signal from the vertical resettable amplifier 28. While the scanning beam is curve following around the periphery of the character, track hold 104 has only its positive gate conditioned so that it follows the signal from horizontal resettable amplifier 28 to the most positive value. The positive follow gate in track hold 104 is conditioned by the signal from OR gate 106, while the negative follow gate in track hold 104 is conditioned by the signal from OR gate 60.

The purpose of OR gate 60 is to signal when it is necessary for the scanning beam to search for the next character. The necessity for a search is indicated either by the primary beam control 50 or by the gating logic 72. The "G" terminal output of the gating logic is the output which indicates that a search is necessary. This "G" terminal output is connected to the "G" terminal at the input of OR gate 60. After the curve follow control 62 has been initiated into the search routine, the search continues until the curve follow control receives a signal from the photomultiplier tube 24 indicating that the curlicue search has struck a character. When this occurs, the curve follow control switches to normal following action and tracks the periphery of the character struck. When normal curve follow action is initiated the curve follow control generates character curve follow output signal which is passed to the gating logic 72 and to the primary beam control 50 to decondition or turn off the search signal being applied to OR gate 60. This character curve follow signal from the curve follow control 62 is also passed to track hold 104 via OR gate 106. This signal is used to condition the track hold 104 to follow positive going signals. Since track hold 104 has its negative follow gate deconditioned (because the inputs to OR gate 60 are deconditioned) track hold 104 will only follow positive horizontal signals when the curve follow control 62 is curve following the outline of character.

As previously pointed out, the search signal from OR gate 60 is passed by OR gate 65 and sets flip-flop 66. In a set condition, flip-flop 66 holds the resettable amplifier 28 to ground. The character curve follow signal from curve follow control 62 is passed by OR gate 67 to reset flip-flop 66. When flip-flop 66 is reset, the resettable amplifier 28 is released and its output is the amplified horizontal deflection signal appearing as if it were at ground when the resettable amplifier 28 was released. This reset horizontal signal is passed to the track hold 104.

The purpose of track hold 104 is to store the maximum positive reset horizontal signal received from amplifier 28 while the beam is curve followed around the outside periphery of the character. This maximum positive horizontal voltage represents the right-hand edge of the character. The voltage is passed from the track hold 104 through switch 102 to the tap on the voltage divider 92 which represents $+X_{max}$ (right-hand edge of character). The voltage applied by switch 102 to the top $+X_{max}$ then fixes all the other voltages at the taps in the voltage divider. The center tap or 50% tap of the voltage divider 92 is connected back to voltage discriminator 108. This center tap voltage then defines the middle of the character which was just curve followed.

Since the curve follow around the character has been completed, the curve follow control 62 initiates the gating logic 72 which directs the scanning beam to follow steps 1 and 2 of the scan pattern (see FIG. 3 for scan pattern). During step 2 of the scan pattern, the horizontal deflection voltage of the amplifier 28 is positive and decreasing. When the voltage out of amplifier 28 becomes less than the voltage at the character center tap (50% tap), voltage discriminator 108 generates an output.

AND gate 110, which follows discriminator 108, is conditioned by gating logic 72 via terminal "A." This terminal has a signal present so long as the gating logic 72 is performing step 2 of the scan pattern. In other words the AND gate 110 is conditioned to pass the output from voltage discriminator 108 when the scanning beam is moving along scan step 2 shown in FIG. 3. The output from AND gate 110 is up momentarily when the scanning beam arrives at the horizontal center above the character just curve followed. This output from AND gate 110 is passed by OR gate 112 to set flip-flop 110. The output from OR gate 112 is referred to as the start-of-vertical-scan signal. As soon as this start-of-vertical-scan signal is received by the gating logic 72, step 3 in the scan pattern (FIG. 3) is initiated and the AND gate 110 is deconditioned. Since flip-flop 100 was set by the start-of-vertical-scan signal, switch 102 is turned off and switch 114 is turned on. The result is that the voltage divider 92 has its center tap (50%) now locked to ground while its positive $X_{max}$ tap is allowed to seek the level specified by the voltage divider action.

The start-of-vertical-scan signal from OR gate 112 is also used to reset the horizontal resettable amplifier 28 to ground. To accomplish this, the start-of-vertical-scan signal is passed by OR gate 65 to the set side of flip-flop 66. Flip-flop 66 remains set until the end of vertical scan which is detected by voltage discriminator 91. The end of vertical scan from voltage discriminator 91 is passed to the gating logic to initiate step 4 of the scan pattern and is also passed to the reset side of flip-flop 66 via OR gate 67. As a result, the resettable amplifier 28 again begins to follow the horizontal deflections upon the initiation of step 4 in the scan pattern. In this way amplifier 28 is reset to ground at the time that the scanning beam is horizontally centered on the character. Simultaneously, the horizontal center of the voltage divider 92 and therefore the position detection matrix 32 have been locked to ground. Therefore, the output from the amplifier 28 is now coordinated with the center tap of the position detection matrix 32 as both are referenced to ground at character center.

In mode 2 operation the purpose of a horizontal reset is to reset the horizontal amplifier 28 and start the gating logic 72 when the scanning beam is positioned to make the vertical scan through the next character to be read. To accomplish this purpose the horizontal reset monitors the extended portions of step 6 and step 10 in the scan pattern to detect the horizontal edge of the next character. The selection of these two portions of the scan pattern is controlled by the two AND gates 116 and 118.

One conditioning input to AND gate 116 is the terminal "B" from gating logic 72. The terminal "B" has a signal present when the gating logic 72 has directed the current sources to perform step 6 of the scan pattern. Another conditioning input for AND gate 116 is the output from voltage discriminator 120. The voltage discriminator 120 detects when the reset horizontal deflection signal from amplifier 28 is more negative than negative $X_{max}$ (left-hand edge of the character being read, i.e., numeral 2 in FIG. 3). Accordingly, 120 has an output only when the scanning beam is to the left of the character being read. It is in this area to the left of the character being read that the next character may be intercepted. The last conditioning input to AND gate 116 is the 0 output from flip-flop 122.

The purpose of flip-flop 122 is to indicate when during the extended scan the scanning beam intersects the next character. To accomplish this purpose the flip-flop 122 is set by AND gate 124. AND gate 124 is conditioned by the voltage discriminator 120 and by the threshold detector 98. Accordingly, AND gate 124 will have an output only when the scanning beam makes a crossover to the left of the numeral 2, i.e., strikes the next character. The reset of flip-flop 122 is controlled by the output from voltage discriminator 86. Voltage discriminator 86 has an output every time the scanning beam reaches the right-hand edge of the scanning pattern ($+X_{max}$ $+20$ mils). Thus the flip-flop 122 is reset prior to the start of the horizontal scan in step 6 and in step 10.

To summarize the action of AND gate 116, AND gate 116 is conditioned on if the scanning beam is performing the step 6 horizontal scan and if the scanning beam is located to the left of the character being read and if the scanning beam has not yet intercepted the next character. The output from AND gate 116 is used to activate track hold 126. Track hold 126 monitors the output from the horizontal reset amplifier 28 and follows that output so long as AND gate 116 is conditioned. When flip-flop 122 is set because the scanning beam intercepts the next character, AND gate 116 is no longer conditioned. Track hold 126 then holds the voltage it was receiving from amplifier 28 at the time that flip-flop 122 was set. Accordingly, track hold 126 stores the voltage which corresponds to the right-hand edge of the next character as detected during step 6 of the scan pattern.

AND gate 118 operates just as AND gate 116 except that AND gate 118 is conditioned during step 10 of the scan pattern. As can be seen from FIG. 3, step 10 corresponds to the horizontal scan through the upper portion of the characters. Track hold 128 is controlled by AND gate 118 in the same manner that track hold 126 was controlled by AND gate 116. In other words, track hold 128 follows the horizontal reset deflection signal from amplifier 28 when AND gate 118 is conditioned on. AND gate 118 is conditioned on when the scanning beam is in step 10 of the scan pattern and when the scanning beam is to the left of the character being read and when the scanning beam has not intercepted the next character. Immediately upon the scanning beam intercepting the next character, AND gate 118 is no longer conditioned and track hold 128 holds the voltage it was receiving at the time the scanning beam intercepted the next character. This voltage would again correspond to the right-hand edge of the next character.

The reason for having two track hold circuits 126 and 128 to detect the right-hand edge of the next character is that depending upon the shape of the character the upper horizontal scan 10 or the lower horizontal scan 6 may or may not intercept the right-hand edge of the next character. However, if a character is not misregistered, either the upper or lower horizontal scan will intersect it. If both intersect it, then it is necessary to detect which right-hand edge is furthest to the right.

To select the furthest right-hand edge of the next character, voltage discriminator 130 controls switches 132 and 134. If an output from track hold 126 is greater than the output from track hold 128, the voltage discriminator 130 has an output signal which turns on switch 132. On the other hand, if the output from track hold 128 is greater than the output from track hold 126, the voltage discriminator 130 output is down rather than up. Inverter 136 inverts this signal from voltage discriminator 130 and turns on switch 134. Switch 134 then passes the output from track hold 128. Accordingly, the common connection of outputs from switches 132 and 134 will always have the voltage of the far right-hand edge of the next character. This voltage is applied to the voltage divider 138. The tap off of the voltage divider 138 represents a voltage corresponding to the horizontal center of the next character to be scanned.

At the end of one cycle of the scan pattern, the gating logic looks to see if a misregistration has been detected. If there is no indication of a misregistration, the gating logic starts step 14*a* of the scan pattern. During step 14*a* the gating logic 72 conditions AND gate 140 via the terminal "F." The other input to AND gate 140 is from voltage discriminator 142.

The purpose of voltage discriminator 142 is to detect when the scanning beam is located at the horizontal center of the next character. To accomplish this the voltage discriminator compares the horizontal center voltage from voltage divider 138 with the horizontal deflection voltage from amplifier 28. When the horizontal deflection voltage is more negative than the horizontal center of the next character, the voltage discriminator 142 generates an outout. This output is passed by AND gate 142 and OR gate 112 and becomes the start-of-vertical-scan signal for the next character. As previously described, the start-of-vertical-scan signal triggers the resetting of the horizontal resettable amplifier 28 and also triggers the gating logic 72 to start step 3 of the scan pattern.

The start of a new cycle in the scan pattern does differ from the start of the first scan pattern in that there is no change in the biasing of the voltage divider 92. The output from OR gate 112 in the first cycle caused flip-flop 100 to be set. Flip-flop 100 has remained in the set condition, and therefore at the start of a new cycle the start-of-vertical-scan signal has no effect on flip-flop 100. Accordingly, switch 114 maintains the center tap of the voltage divider 92 at ground. However, as previously pointed out, the start-of-vertical-scan signal does cause the resettable amplifier 28 to be reset to ground at the center of the next character. Therefore, the horizontal position calculator (voltage divider 92) and the horizontal resettable amplifier 28 are referenced to ground at the center of the next character. Of course, once the vertical scan or step 3 of the scan pattern starts again, the next character becomes the character being read and its succeeding character would be the next character.

Reference is now made to the lower half of FIG. 2A wherein the details of the vertical reset are shown. As pointed out in the general description, the mode 1 operation in the vertical reset operates simultaneously with the mode 1 operation in the horizontal reset. In mode 1 operation OR gate 60 has initiated the curve follow control into the search and register routine. This signal from OR gate 60 is also used to reset the vertical resettable amplifier 30 by setting flip-flop 64. Also, the output from OR gate 60 causes track hold 144 to follow positive and negative swings in the output from amplifier 30. When the scanning beam intercepts the first character, the curve follow control 62 switches into the normal curve follow operation around a character and generates the character curve follow signal. The character curve follow signal resets flip-flip 64 which releases resettable amplifier 30 from the reset condition. The resettable amplifier 30 then has an output which is the amplification of the input signal as if the input signal had been at ground when the amplifier was released. The character curve follow signal is also passed by OR gate 106 to cause the track hold 144 to follow positive swings in the vertical deflection signal out of resettable amplifier 30. Therefore, track hold 144 will store the voltage corresponding to the top of the character as the curve follow control causes the scanning beam to curve follow around the periphery of the character. The character curve follow signal has one last function in that it sets flip-flop 146 whose output turns on switch 148. Switch 148 passes the output of track hold 144 to the $+Y_{max}$ tap on the vertical voltage divider 94. Simultaneously the 0 output from flip-flop 146 is down and thereby turns off switches 150–155 by deconditioning AND gates 160–165. The function of these AND gates 160–165 and switches 150–155 will be discussed with regard to mode 2 operation of the vertical reset.

To review the mode 1 operation, track hold 144 has followed the positive swing in the resettable amplifier 30 as the first character was curve followed. The maximum positive swing or top of character voltage has been applied by switch 148 to the $+Y_{max}$ terminal of the vertical voltage divider 94. The voltage taps off of the voltage divider 94 are then used to define the vertical voltage level in the scan pattern until the first vertical scan. Upon the first vertical scan which occurs during step 3 of the scan pattern the vertical reset goes into mode 2 operation.

In mode 2 operation flip-flop 168 is set when it receives the start of vertical scan signal. The set condition in flip-flop 168 provides one of the conditioning inputs to AND gates 170–175. Flip-flop 168 is reset at the end of the vertical scan by voltage discriminator 91 which detects the end of the vertical scan. Therefore, the AND gates 170–175 can only be conditioned on during the vertical scan.

The start-of-vertical-scan signal is also used to reset flip-flop 178. This flip-flop is set when the scanning beam during vertical scan first hits the character. Accordingly, the set input to flip-flop 178 is triggered by threshold detector 98. After being set, flip-flop 178 remains in the set condition until the next start of vertical scan. Accordingly, flip-flop 178 acts to select out from all the crossovers only the first crossover occurring during the vertical scan. The rising change in state in flip-flop 178 when the first crossover in vertical scan is detected is converted to a pulse by singleshot 180. Singleshot 180 feeds AND gates 181 and 182 which in turn set and reset flip-flop 183. The outputs of flip-flop 183 are fed back to the input of AND gates 181 and 182 so that flip-flop 183 changes state every time singleshot 180 has an output pulse. In effect, flip-flop 183 changes state once during each vertical scan at the time that the first crossover is detected.

The outputs from flip-flop 183 have several functions. The first of these is to condition alternately the two sets of AND gates 160–162 and 163–165. For example, AND gates 160, 161 and 162 have as a conditioning input the one output from flip-flop 183. On the other hand, AND gates 163, 164 and 165 have as a conditioning input the 0 output from flip-flop 183. Accordingly, AND gates 160–162 and AND gates 163–165 will be conditioned in alternate sets. Note that another conditioning input to all the AND gates 160–165 is the 0 output from flip-flop 146. Flip-flop 146 is reset by the first crossover in the vertical scan as indicated by singleshot 180.

Another function of the outputs from flip-flop 183 is to alternately activate track holds 184 and 186 so that while one track hold is following the vertical deflection signal from amplifier 30 the other track hold is holding. Since the flip-flop 183 changes state at the time of the first crossover during vertical scan then one of the track holds during each vertical scan is switched to holding the voltage at the point of the first crossover. Track hold 184 is coordinated with AND gates 160–162 so that it is holding when the AND gates are conditioned by flip-flop 183. Likewise, track hold 186 is holding when AND gates 163–165 are conditioned by flip-flop 183.

The last function of the outputs from flip-flop 183 is connected with the resetting of the two sets of flip-flops 190–192 and 193–195. These two sets of flip-flops are alternately reset. Flip-flops 190–192 are reset when AND gates 160–162 are deconditioned by flip-flop 183. Likewise, flip-flops 193–195 are reset while AND gates 163–165 are deconditioned by flip-flop 183. The reset action occurs at the end of the vertical scan and is accomplished by an AND gate for each set of flip-flops. AND gate 196 resets the flip-flop set 190–192, while AND gate 198 resets the flip-flop set 193–195. AND gate 196 is conditioned by the end of vertical scan signal from voltage discriminator 91 and the 0 output from flip-flop 183. AND gate 198 is conditioned by the end of vertical scan signal from voltage discriminator 91 and the one output from flip-flop 183.

The setting of the two sets of flip-flops 190–192 and 193–195 is keyed to the mode 2 operation of the vertical reset. The problem which the mode 2 operation solves is that the vertical scan may first strike the character at its top or in the middle or at the bottom depending upon the shape of the character. If the voltage of the first crossover is to be used as a reference for making the vertical reset, it is necessary to add in correction factors dependent upon whether the first crossover occurs at the top, middle or bottom of the character.

The track holds 184 and 186 store alternately the first crossover voltage. If this corresponds to the top of character, then this voltage should be gated with little change to the positive $Y_{max}$ terminal of the voltage divider 94. However, if the crossover occurs at the middle or bottom of the character then it is necessary to add a correction voltage to the track hold voltage so as to arrive at the top of character voltage. The track hold voltage plus the correction voltage to arrive at top of character voltage can be gated to the positive $Y_{max}$ tap of the voltage divider 94.

The correction factors are provided by the voltage divider networks 185 and 187 attached respectively to the output of track holds 184 and 186. In each case the first tap on the voltage divider closest to the track hold provides essentially the same voltage as the output of the track hold. The second tap from the track hold adds to the voltage from the track hold a voltage equivalent to half of a character height. The third tap from the track hold adds to the voltage from the track hold a voltage equivalent to the character height. Therefore, to apply the top of character voltage to the positive $Y_{max}$ tap divider 94 requires the proper selection of switches 150–152 or 153–155.

To show selection of a switch, the upper half of the vertical reset operating on switches 150–152 will be examined. The lower half operating on switches 153–155 operates in exactly the same manner on alternate vertical scans. The reason for the alternating operation is that one set of switches in the vertical reset provides the $+Y_{max}$ voltage for the present character and thus acts as a reference for the reference positions or boundaries while the other set of switches in the vertical reset are being selected to determine the top of character voltage of the next character.

Now to select a switch in the top set 150–152 requires that one of the AND gates 170–172 be conditioned on. AND gate 170 is conditioned by the fact that a vertical scan is taking place, the fact that singleshot 180 has an output pulse indicating the first crossover and the fact that the scanning beam is above three-fourths of the character height as indicated by the voltage discriminator 88. Voltage discriminator 88 has an output so long as the vertical deflection is greater than the voltage at the 75% tap on the vertical voltage divider 94. Accordingly, AND gate 170 will have an output if a crossover occurs in an area where the top of character would be located.

AND gate 171 acts just as AND gate 170 except that it is conditioned to look for a crossover during the middle 50% of a character, i.e., between the 25% tap and the 75% tap on the vertical voltage divider 94. Accordingly, if AND gate 171 has an output, the crossover occurred in an area where the middle of the character would be expected.

Finally, AND gate 172 operates just as AND gates 170 and 171 except that it looks for a crossover below the voltage at the 25% tap on voltage divider 94. AND gate 172 would have an output if the first crossover occurred in an area where the bottom of the character would be expected. In summary, one of the AND gates 170, 171 or 172 has an output every alternate vertical scan and that output will indicate whether the crossover occurred at the top, middle or bottom of the character.

Flip-flops 190, 191 and 192 are responsive to the AND gates 170, 171 and 172, respectively. Accordingly, the one AND gate that has an output will set its associated flip-flop. Therefore, the flip-flops 190, 191 and 192 act to store the information detected by the AND gates 170, 171 and 172, i.e., the flip-flops store the location of the first crossover as being at the top, middle or bottom of the character.

The one flip-flop of the set 190, 191 and 192 which is set will condition its associated AND gate from the set 160, 161 and 162. As previously pointed out, the other conditioning inputs to these AND gates are the outputs from flip-flops 183 and 146. The output from flip-flop 146 indicates the vertical reset is in mode 2 operation and the output from flip-flop 183 indicates that the top half of the vertical reset is active. Therefore, the AND gate of the set 160, 161 and 162 which is conditioned by all three of its inputs selects the switch 150, 151 or 152. The switch of the set 150, 151 and 152 which is turned on then selects the correction factor to be added to the voltage from track hold 184. Accordingly, the output from the set of switches 150–152 will always be the top of character voltage.

This top of character voltage is applied to the positive $Y_{max}$ tap of voltage divider 94. The previous top of character voltage supplied by the switches of set 153–155 is now de-activated since the flip-flop 183 is no longer conditioning the set of AND gates 163–165. The selection of the switches 153, 154 and 155 in the alternate scan is exactly the same as that for the selection of the switches 150, 151 and 152 as just described. Thus, during alternate vertical scans the vertical reset continues to operate in mode 2 operation until a misregistration is detected.

To detect a horizontal misregistration, OR gate 200, AND 202 and flip-flop 204 are provided (shown in the left-hand middle portion of FIG. 2A). OR gate 200 has an output during steps 6 and 10 of the scan pattern shown in FIG. 3. Terminal "B" from the gating logic 72 is up during step 6 of the scan pattern which is the horizontal scan through the bottom area of a character. Terminal C at OR gate 200 is up during step 10 of the scan pattern which is the horizontal scan through the top area of a character. The output from OR gate 200 conditions AND gate 202 to pass signals from flip-flop 122. Flip-flop 122 has an output from its one output if the right-hand edge of the next character is intercepted during a horizontal scan. Therefore, AND gate 202 has an output if during step 6 or step 10 of the scan pattern the right-hand edge of the next character is detected.

The output from AND gate 202 sets flip-flop 204. This causes the 0 output from flip-flop 204 to disappear. Flip-flop 204 is reset at the start of vertical scan so that if no right-hand edge is detected during step 6 and step 10 of the scan pattern, flip-flop 204 will remain reset indication horizontal misregistration. Its 0 output is then passed by OR gate 206 to the gating logic. In response to a signal from OR gate 206 the gating logic initiates step **14*b* after step 13 in the scan pattern. At the end of step 14*b* the gating logic generates a signal out on terminal "G" which is passed by OR gate 60 to the curve follow control 62** to initiate the curve follow search and register routine.

To detect vertical misregistration, OR gate 208, singleshot 210, AND gate 212 and flip-flop 214 are provided. OR gate 208 has an output during the horizontal scans normally below and normally above the next character. Terminal "D" at the input to OR gate 208 is up when the gating logic is performing step 4 of the scan pattern. Similarly, terminal "E" at the input to the OR gate 208 is up when the gating logic is performing step 12 of the scan pattern. Thus, AND gate 212 is conditioned to pass a signal from singleshot 210 during step 4 or step 12 of the scan pattern. Singleshot 210 generates an output pulse each time threshold detector 98 indicates a crossover. Therefore, AND gate 212 will have an output if a crossover occurs during either step 4 or step 12 of the scan pattern. The output from AND gate 212 is used to set flip-flop 214 if flip-flop 214 is set its one output is passed by OR gate 206 to the gating logic to indicate that a vertical misregistration has taken place. The gating logic 72 upon receiving the indication of the misregistration initiates step **14*b* at the proper time of the scan pattern. Flip-flop 214** is reset at the start of the vertical scan so that it is able to detect vertical misregistrations in each new cycle of the scan pattern.

OPERATION

To obtain a composite picture of the operation of the invention the apparatus in FIG. 2 will be described with reference to making the operative scans shown in FIG. 3. Initially, the primary beam control 50 directs the scanning beam to a position just to the right of the numeral 2. Then the primary beam control 50 passes a signal via OR gate 60 to initiate the curve follow control 62 into the search and register routine. The curve follow control directs the scanning beam in a curlicue pattern horizontally towards the character. Meanwhile, the initialization signal from primary beam control 50 has also caused the resetting of resettable amplifiers 28 and 30, track holds 104 and 144 and flip-flop 100. When during the search and register routine the scanning beam hits the first character, the curve follow control 62 generates a signal indicating that the character is being curve followed. This character curve follow signal releases the amplifiers 28 and 30 so that their output follows the deflection signals as if the d.flection signals had been at ground when the release occurred. The character curve follow signal also starts track holds 104 and 144 following only the positive fluctuations in the signal from the horizontal resettable amplifier 28 and the vertical resettable amplifier 30, respectively. Finally, the character curve follow signal turns on switch 148 by acting through flip-flop 146.

After the first character has been curve followed around its entire periphery, the track hold 104 contains a voltage indicating the right-hand edge of the first character while the track hold 144 contains a voltage indicating the top of a character. These voltages are applied to the horizontal voltage divider 92 and the vertical voltage divider 94 by the switches 102 and 148, respectively. Therefore, after one complete curve follow cycle around the character the normalization matrix has coordinates based upon an initial voltage determined for the right-hand edge of the character and the top of the character.

At the end of the character curve follow cycle the curve follow control 62 sends a signal to gating logic 72 to initiate step 1 of the scan pattern shown in FIG. 3. Step 1 of the scan pattern directs the scanning beam to a position 20 mils to the right of numeral 2 (which has just been curve followed) and 30 mils above the numeral 2. The position boundaries for this operation are defined by voltage discriminator 86 which has an output when the beam is at $+X_{max}$ +20 mils and voltage discriminator 87 which has an output when the beam is at $+Y_{max}$ +30 mils.

After the scanning has reached this position above and to the right of the character, the gating logic switches into step 2 of the scan pattern. The scanning beam then moves horizontally to the left until it reaches the horizontal center of the numeral 2. The horizontal center of the numeral 2 is detected by voltage discriminator 108 which compares the horizontal deflection signal with the character center as defined in the horizontal voltage divider 92. The signal out of voltage discriminator 108 is passed by AND gate 110 and OR gate 112 and sets flip-flop 100. The output of the OR gate 112 is referred to as the start-of-vertical-scan signal.

The start-of-vertical-scan signal is used for several purposes. First, it resets the horizontal resettable amplifier 28 to ground. This occurs while the flip-flop 100 is turning on switch 114 so that the horizontal center in the voltage divider 92 is locked to ground. Therefore, the output of amplifier 28 is now coordinated with the voltage divider 92, i.e., both of them will be at ground when the scanning beam is at the horizontal center of the character.

The start-to-vertical-scan signal also signals the gating logic 72 to start step 3 of the scan pattern which is the vertical scan down through the numeral 2. The start of vertical scan signal sets flip-flop 168 and resets flip-flop 178. The output from flip-flop 168 then conditions AND gates 170–175. Meanwhile, flip-flop 178 monitors the output from threshold detector 98 looking for the first crossover point. When the scanning beam hits the top of the numeral 2, flip-flop 178 is set and singleshot 180 generates an output pulse. The output pulse from singleshot 180 resets flip-flop 146 which in turn turns off switch 148 and conditions AND gates 160–165. The pulse from singleshot 180 changes the state of flip-flop 183. It does not matter whether flip-flop 183 is set or reset by the output pulse from singleshot 180 as this just controls whether the upper half of the vertical reset or the lower half of the vertical reset is active. Assuming the pulse from singleshot 180 sets flip-flop 183 and the upper half of the vertical reset is active.

As the crossover occurred at the top of the numeral 2 which is above a 75% point on the voltage divider 94, AND gate 170 is the gate which is conditioned on. The output from AND gate 170 sets flip-flop 190 whose output in turn conditions AND gate 160. AND gate 160 has its other two terminals conditioned by the fact that flip-flop 183 is in the one state and flip-flop 146 is in the 0 state. Therefore, AND gate 160 has an output which turns on switch 150. Switch 150 then passes the voltage in track hold 184 essentially unchanged to the $+Y_{max}$ tap of the voltage divider 94. Track hold 184 contains the voltage at the top of the numeral 2 since the track hold was following the vertical deflection voltage until the first crossover was detected. In other words, the track hold 184 was active until flip-flop 183 changed state at which time the 0 output from flip-flop 183 disappeared and the track hold held the vertical voltage present at the time of the first crossover.

The scanning beam passes down through the numeral 2 during the vertical scan and when it reaches a position 30 mils below the negative $Y_{max}$ voltage, voltage discriminator 91 indicates the end of vertical scan. This end of vertical scan signal is passed to the gating logic to initiate step 4 of the scan pattern. The end of vertical scan is also passed back to flip-flop 168 to reset it in preparation for the next vertical scan and to AND gates 198 and 196 to reset one-half of the vertical reset depending upon the condition of flip-flop 183. For example, since flip-flop 183 is inset 1's state, the lower half of the vertical reset has its flip-flops 193–195 reset since AND gate 198 is conditioned to pass the end of vertical scan signal. This means that the upper half of the vertical reset will define the boundaries until the next vertical scan. At which time the lower half of the vertical reset can be used to reset the vertical voltage divider 94.

One last function of the end of vertical scan signal is to reset flip-flop 66. By resetting of flip-flop 66 horizontal amplifier 28 is released from its reset to ground condition. Accordingly, thereafter as the horizontal voltage varies, the output of the amplifier acts as if the ground voltage for the horizontal deflection signal was at the horizontal center of the numeral 2. As previously pointed out, this coordinates the deflection signals from amplifier 28 with the horizontal center of the voltage divider 92. When the deflection signal out of the amplifier 28 is at ground, the scanning beam is at the center of the numeral 2 and this corresponds to the center of the numeral 2 being defined as the 50% tap on the voltage divider 92.

During step 4 of the scan pattern, OR gate 208 has an output because terminal "D" is up. The output from OR gate 208 conditions AND gate 212 to pass any signals from singleshot 210. However, singleshot 210 is not fired because during the horizontal scan (step 4) below the numeral 6 the scanning beam does not intersect a character. Therefore, flip-flop 214 remains reset indicating that thus far no misregistration has been detected. If the numeral 6 had been misregistered vertically down by at least 30 mils, then the scan during step 4 would have hit the numeral 6 and flip-flop 214 would have been set.

When the scanning beam reaches the voltage position $-X_{max}$ −20 mils −1/P, voltage discriminator 82 generates an output which triggers the gating logic into step 5 of the scan pattern. During step 5 the scanning beam is moved horizontally back to a position 20 mils to the right of the numeral 2 and at a point one quarter of a character height from the bottom of the numeral 2. This position is defined by the voltage discriminator 86, which has an output when the scanning beam reaches the $+X_{max}$ +20 mils position, and the voltage discriminator 90 which has an output when the scanning beam reaches the voltage at the 25% point on the vertical voltage divider 94. When the scanning beam is at the positions defined by voltage discriminators 86 and 90, it begins step 6 of the scan pattern which is a horizontal scan left through the lower half of the numerals 2 and 6. During this step 6 scan, AND gate 116 is conditioned by terminal "B" from the gating logic 72. In addition, AND gate 116 is conditioned by voltage discriminator 120 when the scanning beam is to the left of the left-hand edge of the numeral 2. In addition, the AND gate 116 is conditioned by the reset or 0 output from flip-flop 122. Flip-flop 122 being reset at the beginning of the step 6 by voltage discriminator 86. Therefore, AND gate 116 has an output which causes track hold 126 to follow the horizontal deflection signal out of the amplifier 28.

As the scanning beam proceeds left from the numeral 2 during step 6 scan, the voltage discriminator 120 conditions AND gate 124 to pass crossovers detected by threshold detector 98. When during step 6, the scanning beam strikes the right-hand margin of the numeral 6, AND gate 124 has an output which sets flip-flop 122. This deconditions AND gate 116 which causes the track hold 126 to hold the horizontal voltage at the time that the right-hand edge of the numeral 6 was detected. When the scanning beam reaches the voltage position $-X_{max}-20$ mils $-1/2P$, voltage discriminator 83 has an output which causes gating logic 72 to initiate step 7 of the scan pattern. During step 7 the scanning beam is moved to the right and up until voltage discriminators 86 and 89 are satisified. At this point the gating logic initiates step 8 in the scan pattern. Step 8 causes the beam to move horizontally to the left until voltage discriminator 83 is satisfied. Gating logic then initiates step 9 of the scan pattern which causes the beam to move up and to the right until voltage discriminators 86 and 88 are satisfied. At this point the gating logic initiates step 10 of the scan pattern.

During step 10 of the scan pattern, AND gate 118 is conditioned by terminal C from the gating logic 72. AND gate 118 is also conditioned by voltage discriminator 120 when during step 10 of the scan pattern scanning beam is moved to the left of $-X_{max}$. AND gate 118 is also conditioned by the 0 output from flip-flop 122 which has been reset by voltage discriminator 86 just before the start of step 10 of the scan pattern. As the scanning beam is moved to the left towards numeral 6, the flip-flop 122 is to be set upon the intersection of the right-hand edge. However, since the numeral 6 is shaped such that its upper extension is far to the left, scanning step 10 does not intersect the numeral 6. Therefore, flip-flop 122 remains reset. AND gate 118 is not deconditioned until the end of step 10 by the "C" terminal. Therefore the track hold 128 will store the voltage at the far left end of scan step 10.

Voltage discriminator 130 proceeds to select the furthest right voltage stored in track holds 126 and 128. Since the voltage at the right-hand edge of the numeral 6 stored in track hold 126 is greater than the voltage at the end of step 10 of the scan pattern as stored in track hold 128, the voltage discriminator has an output which is up. This output turns on the switch 132 which passes the voltage stored in track hold 126 to the voltage divider 138. This voltage applied to top of voltage divider 138 represents the voltage at the far right-hand edge of the numeral 6. The voltage out of the center tap of voltage divider 138 in turn represents the horizontal center of the numeral 6.

When voltage discriminator 83 is satisfied at the end of step 10 of the scan pattern, gating logic 72 initiates step 11. This causes the scanning beam to move to the right and up to the position $+Y_{max}+30$ mils and $-X_{max}$. At this point voltage discriminators 87 and 84 are satisfied and cause the gating logic 72 to switch to step 12 of the scan pattern.

During step 12 of the scan pattern terminal "E" at the input of OR gate 208 is up so that the OR gate conditions AND gate 212 to pass a signal from singleshot 210. However, during step 12, the threshold detector 98 does not detect a crossover and so singleshot 210 is not fired. Accordingly, flip-flop 214 remains reset. The reset condition in flip-flop 214 after step 12 of the scan pattern indicates that the numeral 6 is not vertically misregistered.

Horizontal misregistration has previously been checked during step 6 and step 10 of the scan pattern by OR gate 200 and AND gate 202. If during step 6 or step 10 of the scan pattern the numeral 6 is intercepted, AND gate 202 has an output. The condition is satisfied during step 6 as the numeral 6 was intercepted during that scan. Accordingly, during step 6 AND gate 202 has an output and this indication is stored by setting flip-flop 204. Since flip-flop 204 is set, its 0 output terminal is not up indicating that the numeral 6 has been intercepted. Therefore the numeral 6 is not horizontally misregistered.

The end of the step 12 scan is detected by voltage discriminator 82 which causes the gating logic to initiate step 13 of the scan pattern. During step 13 the scanning beam is moved horizontally to the right back to the voltage $-X_{max}$ at which point the gating logic makes the decision whether to proceed into scan **14*a* or scan 14*b*. Because there is no signal from OR gate 206 indicating the numeral 6 is not misregistered, gating logic 72 directs the scanning beam to move along step 14*a***.

During scan **14*a* AND gate 140 is conditioned to pass an output from voltage discriminator 142. Voltage discriminator 142 has an output when the horizontal deflection signal is less than the horizontal center of the numeral 6 defined by the voltage out of the center tap from voltage divider 138. Accordingly, at the center of the numeral 6 voltage discriminator 142 has an output which is passed by AND gate 140 and OR gate 112 and becomes the start-of-vertical-scan signal for the numeral 6. At this point the gating logic is triggered back into step 3 of the scan pattern and the horizontal amplifier 28** is reset to ground so that the scan pattern begins a second cycle.

During this second cycle which starts with a vertical scan through the numeral 6, the lower half of the vertical reset will be utilized. Specifically, AND gate 174 will be conditioned because the first crossover in the numeral 6 during vertical scan will occur in the middle of the character area. This will cause switch 154 to turn on and thereby pass the track hold voltage at the crossover point plus a correction factor to the $+Y_{max}$ terminal of the voltage divider 94. The voltage in the track hold 186 is the voltage where the vertical scan first hits the numeral 6 (at about halfway through the character height). The correction factor added by the voltage divider 187 brings the voltage applied to switch 154 up to the level equivalent to the voltage at the top of the numeral 6. This voltage is then applied through switch 154 to the $+Y_{max}$ of the voltage divider 94.

This example of the operation has been directed to the characters shown in FIG. 3 which are correctly registered. If the numeral 6 had been misregistered either horizontally or vertically, then the OR gate 206 would have had an output. This would have caused the gating logic to go from step 13 into step **14*b*. In step 14*b* of the scan pattern the scanning beam is moved straight down until it reaches a point corresponding to the 50% tap on the voltage divider 94. This position is detected by the inverted output from voltage discriminator 89. At this point, the gating logic generates an output signal on terminal "G" which is passed by OR gate 60 to initiate the curve follow control 62** into the search and register routine. The curve follow control then begins searching for the next character just as if that character were the first character in a line.

The invention has been particularly described with reference to obtaining initial position information from a curve following scan and thereafter performing reset with the scan pattern shown in FIG. 3. It will be appreciated by one skilled in the art that the initial position information could be obtained with a scan pattern other than curve following. Similarly recognition and registration information could be obtained with a scan pattern other than the scan pattern shown in FIG. 3. All that is required is that a scan pattern in the same scan cycle make recognition scans through a character and registration scans through the next character. There can be many variations in the scan pattern and logic and control to achieve this result. One variation would be a scan pattern having two serial phases. During the first phase a first character is scanned for recognition. During the second phase the next character is scanned for registration. While the invention has been particularly shown and described with reference to a preferred embodiment thereof, it will be understood by those skilled in the art that various changes in form and details may be made therein without departing from the spirit and scope of the invention.

What is claimed is:

1. A method for rapidly positioning a single-flying spot scanning beam in a character reader to scan successive character spaces on a document, said method comprising the steps of:
positioning said scanning beam relative to a predeterminal point of a first character space;
moving said beam from said point in a plurality of lines, at least one of said lines having contiguous first and second portions located in said first character space and in a second character space, respectively;
detecting black and white video in said plurality of lines and generating video signals therefrom;
positioning said scanning beam relative to a predetermined point of said second character space in response to a first of said video signals occurring in said second portion of said at least one line;
moving said beam in a search pattern in response to a second of said video signals occurring in said second portion of said at least one line; and
further comprising the step of recognizing the contents of said first chaarcter space at least partially in response to said video signals occurring in at least some of said plurality of lines.

2. A method according to claim 1, wherein at least some of said plurality of lines are substantially horizontal lines each having a first portion located in said first character space and a contiguous second portion extending into said second character space.

3. A method according to claim 2, wherein the second portion of at least one of said horizontal lines extends into said second character space at a position beyond an extremity of a tolerably correctly vertically registered character locatable in said second space; and wherein said first and second video signals represent respectively the absence and presence of black video in the second portion of said at least one horizontal line.

4. A method according to claim 2, wherein the second portion of at least one of said horizontal lines extends into said second character space for a distance sufficient to intercept a tolerably correctly horizontally registered character locatable in said second space; and wherein said first and second video signals represent respectively the presence and absence of black video in the second portion of said at least one horizontal line.

5. A method acording to claim 2, wherein the second portions of a plurality of said horizontal lines extend into said second character space for a distance sufficient that at least one of said second portions will intercept a tolerably correctly horizontally registered character locatable in said second space; and wherein said first video signal represents the presence of black video on the second portion of at least one of said plurality of horizontal lines.

6. A method according to claim 1, further comprising the steps of:
moving said scanning beam in a substantially vertical line in said first character space;
detecting black and white video in said vertical line, and generating further video signals therefrom; and
positioning said plurality of lines relative to the location of one of said further video signals.

7. A method according to claim 6, further comprising the step of recognizing the contents of said first character space at least partially in response to said further video signals.

8. A method according to claim 6, wherein at least one of said plurality of lines is positioned by the steps of:
dividing said first character space into a plurality of zones in a vertical direction;
detecting the occurrence of said one further video signal with respect to said zones;
positioning said at least one line at a first predetermined position relative to one of said zones when said one further video signal occurs within a first of said zones; and
positioning said at least one line at a second predetermined position relative to said one zone when said one further video signal occurs within a second of said zones.

9. A method according to claim 6, wherein said one further video signal represents a first occurrence of black video in said vertical line.

10. A method for rapidly scanning a succession of pairs of character spaces for recognition and registration, comprising the steps of:
positioning a scanning beam relative to a first character space of one of said pairs of character spaces;
moving said scanning beam in a vertical line through said first character space, and detecting video crossovers therein;
moving said scanning beam in a first plurality of horizontal lines into a second character space of said one pair, the vertical position of said horizontal lines being respectively above and below any possible extremities of a not grossly vertically misregistered character locatable therein, and detecting video crossovers therein;
generating a vertical misregistration signal in response to the presence of any crossovers detected in said horizontal lines;
moving said scanning beam in a second plurality of horizontal lines in said first character space, at least one line of said second plurality having a contiguous horizontal portion extending into said second character space, and detecting video crossovers in the lines of said second plurality;
generating a horizontal misregistration signal in response to the absence of any crossovers detected in said contiguous portion;
classifying the contents of said first character space in response to at least some of said crossovers detected in said vertical line and in said second plurality of horizontal lines; and
repeating the above steps upon a further of said pairs of character spaces, a first character space of said further pair being essentially coextensive with said second character space of said first pair.

11. A method according to claim 10, further comprising the step of moving said scanning beam in a search pattern in response to at least one of said misregistration signals.

12. A method according to claim 11, further comprising the steps of:
detecting the location of a first video crossover in said vertical line with respect to a plurality of predefined zones of said first character space;
adding a correction factor to the detected location of said first crossover if said first crossover is located within a predetermined one of said zones; and
positioning said pluralities of horizontal lines at vertical locations relative to said detected location.

13. A method according to claim 12, wherein said second plurality of horizontal lines includes at least a pair of horizontal lines each having a contiguous portion extending into said second character space such that at least one of said contiguous portions will intercept a not grossly horizontally misregistered character locatable therein; and wherein said horizontal misregistration signal is inhibited in response to the presence of any crossovers in any of said contiguous portions.

14. A character reader having a scanner to scan characters on a document, scanner position detection means for detecting when the scanner crosses reference positions in a cyclic scan pattern, a scan control means for directing the scanner along each step in the scan pattern as said scanner position detection means detects that the scanner has crossed a reference position in the cyclic scan pattern, and scan pattern shifting means characterized by:

position calculating means for calculating the scan pattern reference positions used in said scanner position detection means, the calculation of reference positions being based upon the position of the character to be read, the reference positions being located so that in one cycle of the scan pattern said scanner scans one character for recognition and a neighboring character for position registration;

resettable monitoring means for monitoring the position of the scanner relative to the position of the character to be read and passing the scanner position information to said scanner position detection means so that said detection means will detect when the scanner crosses reference positions in the scan pattern;

character position detection means for detecting the position of the neighboring character as the scanner is directed through the scan pattern by said scan control means;

reset means for resetting said monitoring means and said calculating means to calculate based upon and monitored relative to the position of the next character as detected by said character position detection means, said reset means being initiated to operate when said scanner position detection means detects the start of a new cycle in the scan pattern so that the scan pattern is rapidly shifted from character to character as each character is read.

15. Apparatus for rapidly positioning a flying-spot scanner in a character reader to scan successive characters on a document, said apparatus comprising:

scan-control means for directing a single flying spot in a single, continuous scan pattern located alternatingly within both first and second character spaces of a pair of character spaces;

position-detection means for identifying a plurality of interleaved time intervals belonging alternatingly to a plurality of first and a plurality of second portions of said scan pattern, said first and second portions belonging to said first and second character spaces, respectively;

video-detection means for producing signals indicative of black and white video during said first and second portions of said scan pattern; and registration-detection means coupled to said position-detection means and responsive to at least one of said video signals during said second portions of said scan pattern for causing said scan-control means to repeat said scan pattern over a further pair of character spaces, the first character space of said further pair being essentially co-extensive with said second character space of the previously named pair of spaces, said registration-detection means being further responsive to at least another of said video signals for producing a misregistration signal.

16. Apparatus of claim 15, further comprising:

means responsive to said misrergistration signal for inhibiting said scan pattern and for directing said flying spot in a search pattern; and means responsive to a black-video signal from said video-detection means during said search pattern for reactivating said scan-control means.

17. Apparatus of claim 16 wherein said scan pattern includes a plurality of continuous, substantially horizontal lines, said first portions of said scan pattern including a first predetermined portion of each of said horizontal lines, and said second portion of said scan pattern including a second predetermined portion of each of said horizontal lines.

18. Apparatus of claim 16 wherein said second portion of said scan pattern includes a plurality of continuous, substantially horizontal lines located above and below a predetermined area of said second character space.

19. Apparatus for rapidly positioning a scanner in a character reader to scan successive characters on a document comprising:

scan control means for directing the scanner in a cyclic pattern where in one cycle the scanner scans a character for recognition and the next adjacent character for position registration;

position detection means for detecting the position of the next character as the scanner is directed through the cyclic scan pattern; and means for resetting the scan pattern in said scan control means at the start of the next cycle of the scan pattern by shifting the scan pattern to the position of the next character as detected by said position detection means so that the scanner is positioned to scan the next character for recognition and the character following the next character for position recognition, wherein said resetting means comprises:

a vertical resettable monitor for generating a vertical position signal indicative of the vertical position of the scanner;

a horizontal resettable monitor for generating a horizontal position signal indicative of the horizontal position of the scanner;

a horizontal position calculator for calculating horizontal boundaries in the scan pattern, the boundaries being based upon a predetermined horizontal position signal corresponding to a predetermined horizontal position on a character;

a vertical position calculator for calculating the vertical boundaries in the scan pattern, the boundaries being based upon a vertical position on a character;

horizontal reset means for resetting said horizontal monitor to a predetermined output when the scanner is at a predetermined horizontal position on the next character as detected by said position detection means so that the scan pattern is shifted to a horizontal position for recognizing the next character; and vertical reset means for resetting said vertical position calculator to the vertical position of the next character as detected by said position detection means so that the scan pattern is shifted to a vertical position for recognizing the next character.

References Cited

UNITED STATES PATENTS

| | | | |
|---|---|---|---|
| 3,189,873 | 6/1965 | Rabinow | 340—146.3 |
| 3,206,725 | 9/1965 | Fitzmaurice | 340—146.3 |
| 3,231,860 | 1/1966 | Chatten | 340—146.3 |
| 3,243,776 | 3/1966 | Abbott et al. | 340—146.3 |
| 3,295,105 | 12/1966 | Gray et al. | 340—146.3 |

MAYNARD R. WILBUR, Primary Examiner

L. H. BOUDREAU, Assistant Examiner